United States Patent
Dunn et al.

(10) Patent No.: US 10,149,431 B2
(45) Date of Patent: Dec. 11, 2018

(54) HALTING THE SICKLE BAR OF A SICKLE CUTTING APPARATUS AT A PREDETERMINED POSITION

(71) Applicant: Macdon Industries Ltd., Winnipeg (CA)

(72) Inventors: James Thomas Dunn, Winnipeg (CA); Bruce Robert Shearer, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 371 days.

(21) Appl. No.: 14/937,180

(22) Filed: Nov. 10, 2015

(65) Prior Publication Data

US 2017/0127609 A1    May 11, 2017

(51) Int. Cl.
| | |
|---|---|
| A01D 34/13 | (2006.01) |
| A01D 34/40 | (2006.01) |
| A01D 34/14 | (2006.01) |
| A01D 34/30 | (2006.01) |
| A01D 101/00 | (2006.01) |

(52) U.S. Cl.
CPC ............. *A01D 34/40* (2013.01); *A01D 34/14* (2013.01); *A01D 34/30* (2013.01); *A01D 2101/00* (2013.01)

(58) Field of Classification Search
CPC .... A01D 34/40; A01D 34/14; A01D 2101/00; A01D 34/30; A01D 34/008; A01D 34/006; A01D 69/00; A01D 69/10
USPC ...... 56/298, 10.2 R, 10.2 A, 10.8, 11.1–11.3, 56/13.5, 15.1, 15.2, 17.6, DIG. 7, DIG. 15
See application file for complete search history.

(56) References Cited

U.S. PATENT DOCUMENTS

| | | | | |
|---|---|---|---|---|
| 2,569,507 A | * | 10/1951 | Von Schlegell | ....... A01D 34/38 56/11.9 |
| 2,985,992 A | * | 5/1961 | Dowdle | ............. A01D 34/6812 192/18 R |
| 3,228,177 A | * | 1/1966 | Coates | .................... A01D 34/64 188/166 |
| 3,572,663 A | * | 3/1971 | Lely | |
| 3,773,156 A | * | 11/1973 | Nyquist | ................ B62D 49/065 477/167 |
| 3,955,653 A | * | 5/1976 | Comer | ................ A01D 34/6806 188/273 |

(Continued)

*Primary Examiner* — Thomas B Will
*Assistant Examiner* — Mai T Nguyen
(74) *Attorney, Agent, or Firm* — Adrian D. Battison; Ade & Company Inc; Kyle R. Satterthwaite

(57) ABSTRACT

A sickle cutting system is mounted on a header for forward travel over ground having a standing crop thereon and includes a cutter bar with a plurality of knife guards and at least one sickle bar with a drive system for driving the sickle bar through repeated cycles of reciprocating movement from start-up of the system through to a shut-down. The drive system includes an arrangement to halt the sickle bar on shut-down at a predetermined position of the knife blades relative to the knife guards and preferably the position where the blades lie intermediate two knife guards. The system can be halted by either a physical stop member at the required position or by detecting the position of the sickle bar during operation and causing it to halt the required position. The detection can be carried out by counting pulses generated by markers on a rotary member of the drive system.

18 Claims, 6 Drawing Sheets

(56) References Cited

U.S. PATENT DOCUMENTS

| | | | | |
|---|---|---|---|---|
| 4,433,529 A | * | 2/1984 | Herwig | A01D 34/30 340/684 |
| 5,778,644 A | * | 7/1998 | Keller | A01D 41/142 56/11.2 |
| 7,497,069 B2 | * | 3/2009 | Enns | A01D 41/142 56/11.9 |
| 2004/0144075 A1 | * | 7/2004 | Jackson | A01D 34/13 56/257 |
| 2008/0295478 A1 | * | 12/2008 | Majkrzak | A01D 34/38 56/257 |
| 2010/0326032 A1 | * | 12/2010 | Leonardi | A01D 34/416 56/17.1 |
| 2014/0215995 A1 | * | 8/2014 | Cook | A01D 34/145 56/301 |

* cited by examiner

HALTING THE SICKLE BAR OF A SICKLE CUTTING APPARATUS AT A PREDETERMINED POSITION

This invention relates to a sickle cutting apparatus having a reciprocating sickle bar.

BACKGROUND OF THE INVENTION

Many different crop cutting systems includes a sickle apparatus comprising a frame structure arranged for forward travel over ground having a standing crop thereon, a cutter bar secured to the frame structure and extending transversely across a front end of said frame structure, a plurality of knife guards mounted in spaced relation along said cutter bar and projecting forwardly therefrom where each of said guards has a ledger surface with opposed side edges thereof arranged to provide first and second shearing edges, at least one sickle bar mounted in transversely extending position driven for reciprocating movement relative to said knife guards and having a plurality of knife blades mounted thereon for movement therewith with each of the knife blades having two side cutting edges which cooperate with said shearing edges of said knife guards and a drive system for driving said at least one sickle bar through repeated cycles of reciprocating movement from start-up through to a shut-down. Many arrangements of this type are shown in the prior art.

SUMMARY OF THE INVENTION it is one object of the present invention to provide an improved sickle cutting apparatus in which changing of a blade of the sickle bar can be carried out more simply.

According to a first aspect of the invention there is provided a crop cutting apparatus comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom;

each of said guards having a ledger surface with opposed side edges thereof arranged to provide first and second shearing edges;

at least one sickle bar mounted in transversely extending position driven for reciprocating movement relative to said knife guards and having a plurality of knife blades mounted thereon for movement therewith with each of the knife blades having two side cutting edges which cooperate with said shearing edges of said knife guards;

a drive system for driving said at least one sickle bar through repeated cycles of reciprocating movement from start-up through to a shut-down;

the drive system being arranged to halt said at least one sickle bar at said shut-down at a predetermined position of the knife blades relative to the knife guards.

Preferably the sickle bar is halted at said shut-down at the predetermined position in which the knife blades are located between the knife guards and more preferably a center line of each of the knife blades is located midway between center lines of each of two adjacent knife guards. However in some cases it may be desirable to halt the sickle bar at a different location.

Preferably the drive system includes a shut-down procedure by which the sickle bar is driven at a speed slower than a cutting speed to move to the predetermined position.

In some cases the sickle bar is driven in the shut down procedure in a reverse direction to move to the predetermined position. However the sickle bar can also move forwardly. The sickle bar may initially be halted at a first indeterminate position depending upon its rates of slow-down and then may be subsequently moved to the predetermined position. This movement can be carried out in the forward or reverse direction. However the slowdown may also be controlled so that there is no actual halting before movement to the predetermined position.

In one mode of operation the drive system includes a physical stop member to locate the sickle bar at the predetermined position. However other systems for detecting when the sickle bar at the required position can be used.

The physical stop member can comprise a pawl movable to an extended position when the sickle bar is driven at a speed slower than a cutting speed to move to the predetermined position. For example the pawl can be mounted on a rotary member of said drive system such as a flywheel or gear drive wheel. Alternatively the pawl can be mounted on a fixed member adjacent to the rotary member and can be moved into engagement with the rotary member. The rotary member then carries an abutment or notch which engages with the pawl when the abutment reaches the pawl.

In one embodiment that can be provided a first and a second sickle bar mounted in transversely extending position and driven for reciprocating movement relative to the knife guards such that the first and second sickle bars reciprocate at the same frequency but in opposed phase.

In this arrangement, preferably the drive system is arranged to maintain said first and second sickle bars in said predetermined position through to said start-up so that the first and second sickle bars start from said predetermined positions and hence at a predetermined relative phase.

In an alternative arrangement the drive system includes a sensing system which generates a plurality of sensor signals for each cycle of reciprocating movement of the sickle bar and wherein the drive system comprises a control device responsive to the sensor signals arranged to determine, at said shut down, when the knife blades are in the predetermined position of the knife blades to halt the sickle bar at the predetermined position. In this arrangement preferably the drive system is arranged to maintain the sickle bar in the predetermined position through to start-up so that the sickle bar starts from the predetermined position.

In one example the drive system includes a rotary member and wherein the sensing system is arranged to generate the sensor signals at spaced positions around the rotary member. Thus preferably the sensing system comprises a plurality of markers which are arranged to pass a stationary sensor so as to generate a sensing signal for each passing marker. Also preferably within an angle of 360 of a cycle, the sensor signals are equiangularly spaced. Also preferably the control device includes an arrangement for inputting once, for use in a plurality of cycles, data indicating for the sickle bar a specific angle or position of the sickle bar in the cycle relative to the markers associated with the sickle bar.

While the above system can be used with a single sickle bar, it can also be used with an arrangement which has a first and a second sickle bar mounted in transversely extending position and being driven for reciprocating movement relative to the knife guards such that the first and second sickle bars reciprocate at the same frequency but in opposed phase, where each of the first and second drive systems includes a sensing system which generates a plurality of sensor signals for each cycle of reciprocating movement and that is provided a control device responsive to the sensor signals from both of the first and second drive systems for advancing or retarding one of the first and second drive systems so that a number of sensor signals obtained from the first drive system is continually maintained so as to be substantially equal to a number of sensor signals obtained from the second drive system.

In order to carry out the above step to maintain the number of signals substantially equal, preferably the control device is arranged to count the sensor signals and to repeatedly compare the numbers that counted. In the event that a discrepancy in the numbers counted is identified, the control device is arranged to advance or retard said one of the first and second drive systems. Preferably the comparison is carried out within a period of less than one cycle. Typically the comparison is carried out repeatedly or over a number of times per cycle. In this way the system can determine whether the synchronicity is maintained a number of times per cycle and it can carry out corrective measures as soon as the discrepancy is detected. The system therefore operates entirely differently from a system in which each sickle bar has a single marker and indicative of a particular location in the cycle, typically one end, where the system attempts to synchronize the passage of those markers by detecting the timing of their passage.

In the system of the present invention, preferably each of the sensor signals is identical to the others so that none is associated with a specific position within the cycle.

In the system of the present invention, preferably each of the first and second drive systems includes a rotary member and wherein the sensing system is arranged to generate the sensor signals at spaced positions around the rotary member. In an arrangement where the drive system drive system includes a gearwheel, the sensing system can include a sensor which detects the passage of a tooth of the gearwheel. The sensing system can be operated by proximity detection or by blockage of light path or any other suitable sensing systems. In an arrangement where the drive system does not include a suitable gearwheel, typically such drive systems include a flywheel where markers on the flywheel can be detected. One simple example can be provided by holes in the flywheel allowing passage of a light beam which can be detected.

Thus preferably the sensing system comprises a plurality of markers which are arranged to pass a stationary sensor so as to generate a sensing signal for each passing marker. However individual markers each providing a signal can be mounted on the rotary member.

Preferably within an angle of 360 of a cycle, the sensor signals are equiangularly spaced. That is, where a rotary member carries the markers, they are equidistantly spaced around the member. However additional markers may be provided or markers may be omitted at particular positions. The markers can also be provided on the sickle bar itself or another part of the drive system which reciprocates.

Preferably the control device includes an arrangement for inputting once, for use in a plurality of cycles, data indicating for each of the first and a second sickle bars a specific angle of the cutter bar in the cycle relative to the markers associated with that sickle bar. That is a system is preferably provided to initiate the counting of the markers at a position where it is known that the sickle bars are synchronized. The continued synchronization however does not utilize any marker or component indicative of synchronization but instead maintains the synchronization by the counting of the markers of the two sickle bars.

In particular, preferably, the arrangement for inputting data inputs data provides the initialization data when the first and second sickle bars are synchronized in opposed phase. However it will be appreciated that it is only necessary to provide an initialization process so that counting can be carried out to obtain and to maintain synchronization.

In one preferred example the arrangement for inputting data is arranged to operate at a start-up of the first and a second sickle bars. That is an arrangement can be used in which the sickle bars are initially set on start up at a predetermined position, which may be in synchronized relationship or not. In an arrangement in which the sickle bars are halted on shut down at a predetermined known position, this position can be used as the initialization signal for the counting process on start up.

That is the arrangement for inputting data comprises a component of the sensing system which generates a sensor signals indicative of a predetermined location of the first and a second sickle bars in their cycles.

In an alternative arrangement data input can be provided indicating when the first and second sickle bars are synchronized in opposed phase by detecting a minimum level of vibration. That is, a setup procedure can be run in which the synchronization of the system is not known and the level of vibration can be detected during that procedure to determine the minimum vibration level and to identify that level with the synchronized position. Once the synchronized position is determined, the counting process defined above can continue from that position through a multitude of cycles to eventual shutdown. Thus the arrangement for inputting data does not operate for each of the cycles.

In an arrangement where the first and second drive system each comprise a respective one of first and second hydraulic motors connected in series, with fluid under pressure being directed from a source of hydraulic fluid under pressure to the first motor, from the first motor to the second motor and from the second motor to drain, the control device preferably comprises a first valve operable to discharge some fluid passing from the source to the first hydraulic motor to the second motor to advance the second motor and a second valve operable to discharge some fluid passing from the first hydraulic motor to the second motor to drain to retard the second motor.

Alternatively the control device can comprise a single valve operable to discharge some fluid passing from the source to the first hydraulic motor to the second motor to advance the second motor, as this is a more simple, less expensive arrangement.

It is possible to automatically sense the position of each knife so that the controller can also do the initial synchronization. There are various ways to do this, for example cut off one tooth from the gear tooth flywheel at a known location so that on the initialization the controller would know the precise location of the flywheel and therefore the position of the knife. However this system does not use this known location on an ongoing basis but instead carries out the synchronization by counting the pulses from the sensing system.

In an alternative arrangement it is possible to measure the vibration of the header. When the knives are un-synchronized, the header vibrates and it is possible to use this fact to find out when the knives are closely (not perfectly) synchronized.

As described in more detail hereinafter, it is preferred to use a two valve system which controls both the addition of fluid and the release of fluid from the motors. This only applies to the slave motor as the system does not add fluid to the master motor. Thus the arrangement here in acts to control both positive and negative changes position by advancing and retarding the position.

Thus the present systems act to change the position of the slave drive relative to the position of the master drive as opposed to a conventional system which operates to by to match the speed where the second motor is set to run faster and then slowed periodically when required.

Another advantage to the valve arrangement as described hereinafter is that the system does not bleed off fluid continually without reason. Bleeding fluid to reservoir is a waste of power. The present system acts only to bypass flow to the reservoir in the rare occasion where the slave motor is ahead of the master motor in pulse count.

In a conventional arrangement which continually bleeds fluid and has a fixed amount of fluid bypassing the master motor at all times, this amount must be sufficient for the worst leakage condition which is significant. Such a system then acts to bypass most of this flow, other than the leakage amount from the first motor, to the reservoir in all other but the worst case.

In the single valve version, the system can only divert fluid around the master motor directly to the slave motor. If the slave motor is getting too far ahead of the master, say by about 15% of a revolution, the system acts to instantly speed up the slave by diverting MORE fluid so that it advances in position 85% of a revolution (100−15=85%) to get back into synchronization with the master.

The arrangements described in the present application can operate with an epicyclical gear crank (EGC) knife drive as well as the wobble box type drive. The drive motor can be a typical piston motor or a gerotor which typically has slightly more leakage than a piston motor.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
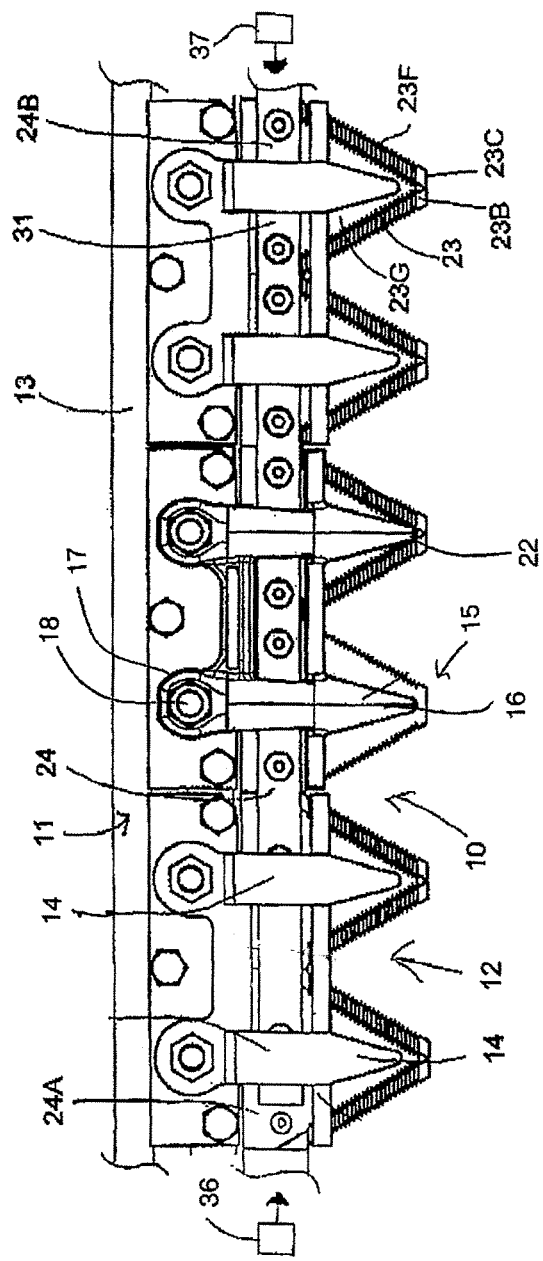
FIG. 1 is a plan view of a cutting apparatus according to the present invention showing a part only of the cutter bar and the knife guards with the two reciprocating sickle bars.

In FIG. 1 is shown a first embodiment of a crop cutting apparatus generally indicated at 10. Only a part of the complete machine is shown since the remainder of the machine may vary widely depending upon requirements and since the construction is of course well known to a person skilled in the art. In this embodiment as shown, there is a frame generally indicated at 11 which of course forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to a cutter bar 15 along the front edge of a frame structure which supports the guard bar in fixed position across the front edge of the frame for a cutting action of the crop cutting device on the standing crop.

The knife guards 14 are arranged in pairs and mounted on the guard bar 13 at spaced positions along the length of the guard bar. In the embodiment as shown, only three of the pairs of guards are shown but it will be appreciated that there are additional guards as required to provide a crop cutting apparatus of a required width.

The knife guards are basically of a conventional construction in that each includes a lower portion 15 and an upper portion 16. These two portions are mounted on the guard bar 13 by a mounting arrangement 17 including bolts 18.

In the embodiment shown the guards are stub guards so that the nose of the upper and lower portions substantially overlie one another and confine between them the blades 23 of the sickle bar 24. However the same arrangement can use pointed guards.

In the embodiment shown there are two sickle bars including a first sickle bar 24A and a second sickle bar 24B. The bar 24A is driven by a reciprocating drive motor 36 and symmetrically the bar 24B is driven by reciprocating drive motor 37. These drive motors are arranged at opposite ends of the sickle bar so that the sickle bars meet at a central guard generally indicated at 30. Each of the sickle bars is driven by the reciprocating drive motor such that the bar reciprocates by a distance equal to the space between each of the guards along the guard bar 13. The reciprocating drive can also drive the sickle bars by distance equal to the space between three or even four of the guards so that the blades travel a greater distance than between two of the guards.

Each sickle bar comprises a support bar member 31 and the plurality of blades indicated at 23. Each of the blades forms a generally triangular-shaped member which has a rear end bolted to the bar and converges from the rear end to a front end 23B. Each of the blades has a side edge 23F and a second side edge 23G. The sides edges are chamfered from the top surface down to the bottom surface 23E so that a sharp edge is formed at the bottom surface at each of the side edges.

Figure 2:
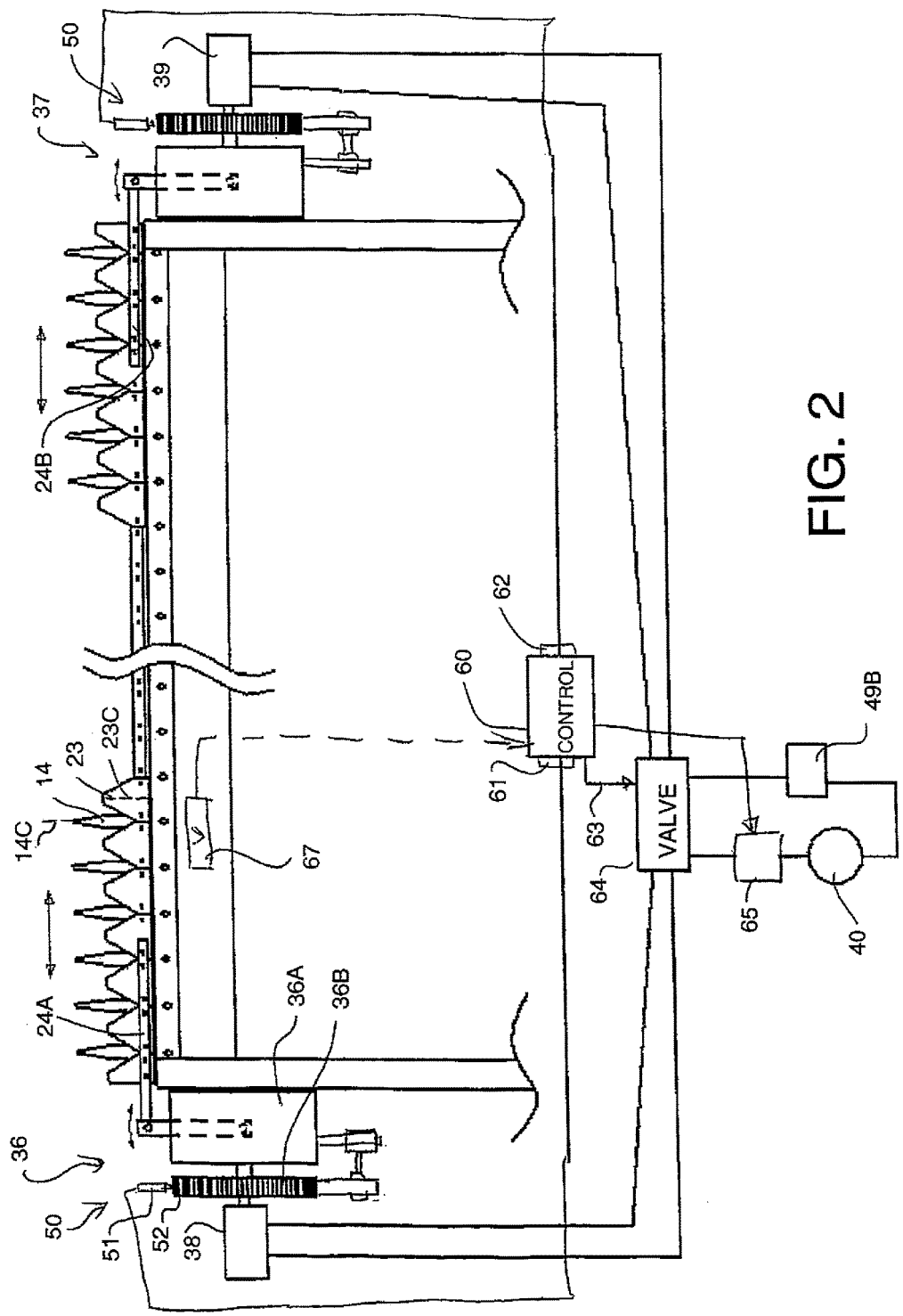
FIG. 2 is a schematic illustration of the cutting apparatus of FIG. 1 showing the sickle bar synchronization system and using a first sensing system on a timing belt drive.

The top member 16 acts to hold the blades downwardly into engagement with the top surface of the bottom portion 15. The bottom portion 15 has two side edges as best shown in FIG. 2 with those side edges 15A and 15B acting as side edges of a ledger surface 15C defined across the top of the bottom portion 15. Thus the cutting action of the blades occurs between the ledger 15C and the bottom surface of the blade as the blade reciprocates from its position at one of the guards to its position at the next adjacent one of the guards. In this cutting action, therefore, the side edge of the blade moves across the space between the guards and enters onto the ledger surface of the guard in a cutting action between the bottom surface of the blade and the top surface of the guard which are immediately adjacent and either in contact or closely adjacent position to provide a shearing action on the crop.

In these conventional guards, the upper portion 16 acts merely as a hold down member contacting the upper surface of each of the blades so as to apply pressure to that upper surface and hold it in contact with or closely adjacent the ledge surface of the bottom portion where the cutting action occurs. The upper portion therefore as shown in FIG. 2 has side surfaces 16A and 16B which are narrower than the side edges of the bottom portion 15.

This construction is well known and widely used in sickle knife cutting systems of this type.

The individual sickle bars 24A and 24B are driven by reciprocating drives 36 and 37, respectively. Such drives can be of any desired type that converts a rotary input motion into a linear motion for reciprocating the sickle bar sections individually. The rotary input to the drives 36 and 37 is provided in the present disclosure by hydraulic motors 38 and 39.

Figure 4:
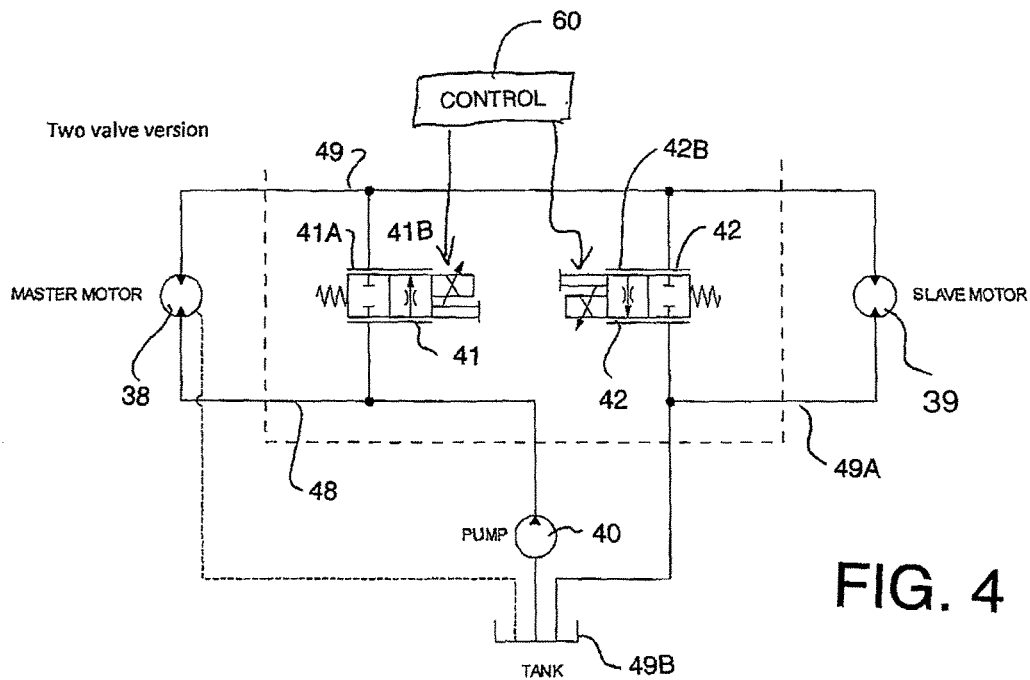
FIG. 4 is a schematic illustration of a first valve arrangement for the control device of FIG. 2.

A first or master hydraulic motor 38 is used for driving the rotary input to the drive 36, a second or slave hydraulic motor 39 is used for driving the rotary input to the drive 37. The two motors, 38 and 39 are shown in FIG. 4 connected in series. The sickle bar sections are driven to move in opposite directions, and they will reciprocate with the inner ends of the sickle bar sections (near the center of the header) moving toward each other and then away from each other as the drive cycles. The sickle bar sections may overlap for about a foot of length, when both sickle bar sections are at the ends of their inward (toward center) strokes, with the sickle knives on the sickle bar sections spaced 3 inches on center, with a 3 or 6 inch stroke.

As described above, therefore, the arrangement provides first and second sickle bars 24A, 24B mounted in transversely extending position across the cutter bar and driven in opposed reciprocating movement across the knife guards at the same frequency but in opposed phase. Each of the sickle bars carries the knife blades thereon which provide side cutting edges cooperating with the edges of the knife guards.

Each of the drive systems 36 and 37 are shown in FIG. 2 include a device 36A for converting rotary movement from a rotary drive wheel 36B into the required reciprocating movement. The drive wheel 36B is driven by the hydraulic master motor 38. On the right-hand side of the system the drive 37 is driven by the slave motor 39.

The drive systems first drive each of the first and second sickle bars through repeated cycles of reciprocating movement back and forth between the guards. Each cycle of movement extends from one end position of a stroke up to unopposed end position of the stroke and back to the first and position. This movement is generated by a single rotation of the drive wheel 36B and the location on the drive wheel 36B can have any associated position in the cycle of the reciprocating movement of the sickle bar.

Each of the drive systems includes a sensing system generally indicated at 50 which is arranged to generate a plurality of sensor signals for each cycle of the reciprocating movement and thus for each rotation of the drive wheel.

In FIG. 2 the drive wheel forms part of a timing belt drive where the wheel includes drive teeth at spaced positions around the periphery of the wheel. In this arrangement the sensor system 50 includes a single sensing device 51 which cooperates with the teeth 52 of the wheel 36B. The sensing system can use a light beam broken by the movement of the teeth or a proximity sensing system which detects the presence of the teeth. Regardless of the system used, the sensing system generates pulses which are transmitted to a control 60 as a stream of pulses which can be detected in the control device 60 and can be counted. Thus the control device includes a counting system 61 for the pulses from the left hand drive 36 and a counting system 62 for the pulses from the right hand drive 37.

The control device 60 is arranged to be responsive to the sensor signals as counted by the counters that 61 and 62 to provide an output 63 to a valve arrangement 64 to control the flow of fluid moving the motors 38 and 39. In this way the control device 60 operates to count the number of pulses received and to operate the valve arrangement 64 so as to continuously maintain the number of pulses counted approximately or substantially equal.

As shown in FIG. 4, the pump 40 supplies fluid through the line 48 to the master motor 38 driving the drive system 36. From the master motor 38, the fluid passes through a line 49 to the slave motor 39. From the slave motor 39 the fluid passes through a line 49A to a drain 49B. The valve assembly 64 includes two valves 41 and 42. The valve 41 is connected across the lines 48 and 49 so it can be operated under control of the control device 60 from a closed position 41A to an open position 41B. In the closed position no fluid transferred from the line 48 to the line 49. In the open position fluid passes from the line 48 to the line 49 and thus bypasses the master motor 38. This fluid which bypasses the master motor acts to advance the slave motor and retard the master motor since the system acts to transfer fluid away from the master motor and to the slave motor by a certain distance of rotation relative to the master motor. The valve 42 includes a closed position 42A and an open position 42B. In the open position a volume of fluid is discharged from the line 49 to the line 49A and thus to the drain. This amount of fluid discharged from the line 49 acts to bypass the slave motor 39 and thus to retard the slave motor by a certain distance of rotation relative to the master motor. In this way the control 60 can operate the valves 41 and 42 to advance and retard the position of the slave motor relative to the master motor.

The valves 41 and 42 are preferably PWM valves which means that they can precisely control the flow through the valves from near zero minimum to the maximum displacement of the valve which is typically around 4 gallons per minute. The amount of fluid that is allowed through the valve is fully controlled by the output of the controller and depends on an algorithm based on how many teeth the two drives are out of synchronization and other factors in a PID control loop. Thus the valves are not merely "open" or "closed" and valve 41 will nearly always be allowing a certain amount of flow equal to the leakage of the master motor to bypass to the second motor. It will be appreciated that all such motors have a slight leakage so that necessarily, in most cases, some fluid is leaked through the master motor so that we slave motor typically runs more slowly.

In operation therefore the control system acts to count the number of pulses arriving from the drive 36 and to compare this number of pulses with the pulses arriving from the drive 37. In the event that the comparison remains equal, no action is required since the two drive systems remain in phase. In the event that the number of pulses from the counter 62 is greater or less than the number of pulses from the counter 61, the control device acts to operate the valves 41 and 42 to advance or retard the slave motor position relative to the master motor position. The counting of the pulses can be in effect continuous so as to detect a soon as a discrepancy in count value occurs. As an alternative, the counting may be carried out in specific sequential time periods so that the system takes action only at the end of the specific time period and only in the event that a discrepancy is detected within that time period.

The control device is arranged to effect the comparison repeatedly during each cycle. Thus in one example the number of teeth on the drive wheel may be of the order of 48 so that there are 48 pulses for each rotation of the drive wheel and each cycle of the sickle bar. This allows the comparison to be effected repeatedly during each cycle so that the correction of the positions of the motors can also be carried out repeatedly each cycle.

It will be appreciated that each tooth of the drive wheel is in effect identical to each of the others so that the pulse generated is the same as the other pulses and has no direct relation to any position of the sickle bar in its cycle. Instead of indicating a particular position, therefore, the system operates to count the pulses so as to repeatedly take steps to maintain the number of pulses equal.

Figure 5:
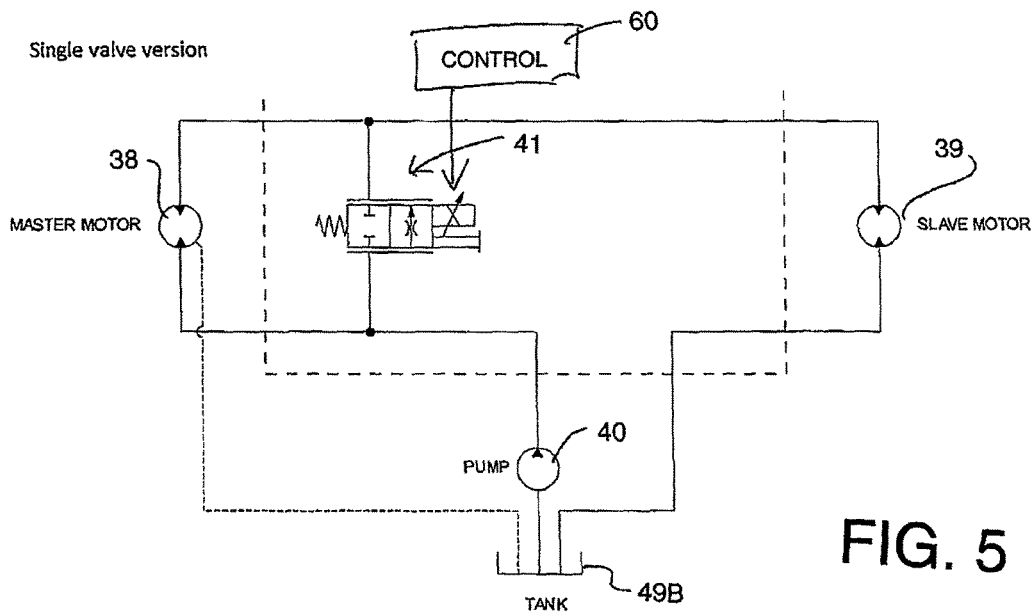
FIG. 5 is a schematic illustration of a second valve arrangement for the control device of FIG. 2.

In FIG. 5 is shown an arrangement which is simplified relative to that of FIG. 4 in that it includes only a single valve 41. This arrangement operates in the event that the slave motor falls behind the master motor by a distance as detected by the counting of the pulses to add fluid to the slave motor relative to the master motor so as to advance the slave motor by the required distance. It is typical that the slave motor will become retarded relative to the master motor rather than advanced. Thus the single valve can be used to move the slave motor forwards by the required distance to maintain the synchronization. In the rare event that the slave motor becomes advanced relative to the master motor, the single valve can be operated to further advance the slave motor into the next cycle so as to recover the synchronization. The temporary period of lack of synchronization as in the slave motor is advanced is sufficiently short to cause no discernible effect.

Figure 3:
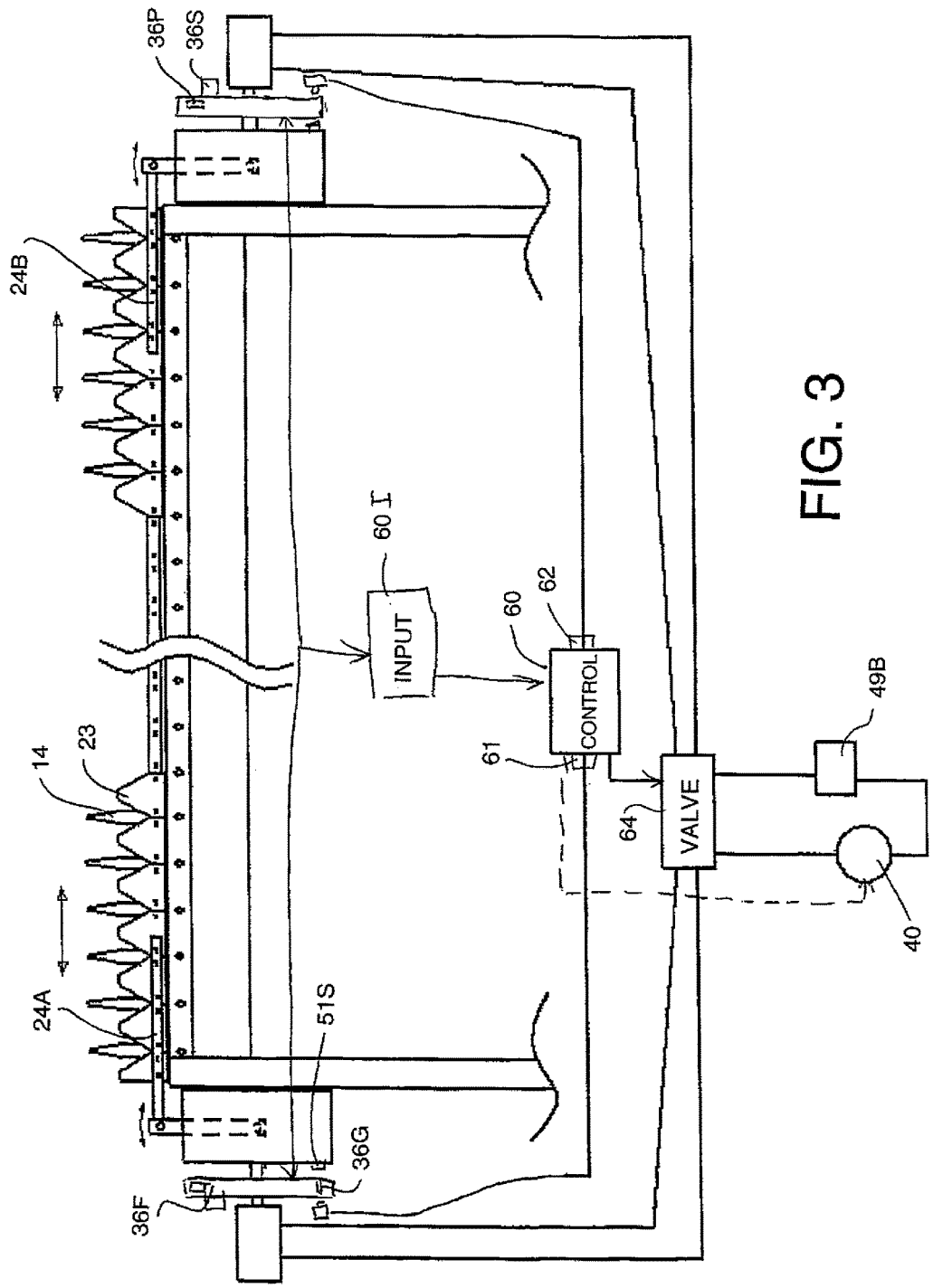
FIG. 3 is a similar schematic illustration to that of FIG. 2 showing a sensing system with a flywheel.

In FIG. 3 is shown an arrangement which uses a drive without a timing belt construction so that the pulses are generated by a sensing system 51S operating on a flywheel 36F. The sensing system 51S can include a light source shining a beam through holes 36G spaced around the flywheel with the beam being sensed by a downstream light sensor to provide a pulse for each passage of a hole. However more preferably the sensor is a proximity sensor that senses the presence/absence of the markers/teeth.

In FIG. 2 is shown an on arrangement where an initialization of the synchronization of the first and second sickle bars is obtained using a vibration sensor 67. The sensor 67 is responsive to vibration of the cutter bar or potentially some other part of the header in a direction preferably longitudinal but could be some other direction as well of the reciprocating movement. This vibration detection is used in an initialization process in which the first and second sickle bars are initially out of phase at some random position. In the initialization protocol, therefore, the sickle bars are driven through a number of cycles while the amount of vibration is detected and the minimum level of vibration is found. This minimum level is assumed to coincide with the synchronization of the two sickle bars so that this position is that entered into the control device as an initial position from which the counting should be carried out and maintained at a constant count value. That is the system acts to maintain 'equal' counts between the two sides.

In FIG. 3 is shown another arrangement in which an input 601 is used to enter an initialization signal to the control device 60 which provides an indication of the initial state of synchronization of the sickle bars. This synchronization state can be obtained by a suitable output at the drive systems which indicates the current position of the rotary member. Thus for example the rotary member may have a marker indicative of an end position of the sickle bar cycle so this marker is detected and provides an initialization signal to the input 601 which is used by the control device 60 to detect when the sickle bars are in synchronization so as to start the count of the pulses maintain a constant pulse value. Again this synchronization signal can be used only at startup or only very occasionally since the control of synchronization is carried out by the pulse counting system. The initialization signal indicative of the position of the sickle bars is not used for synchronization in each cycle of the sickle bars. However in some cases this initialization signal, if detected in each of the cycles, can be used for each and every cycle in addition to the counted pulses for use in the algorithm controlling the bypass valves.

Figure 6:
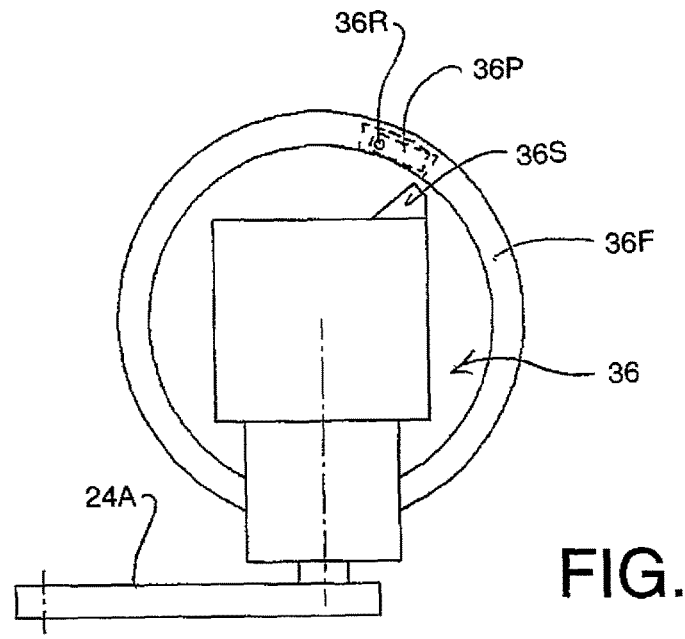
FIG. 6 is a schematic illustration of one of the drive arrangements showing a first pawl device for locating the sickle bar at a predetermined position.
Figure 7:
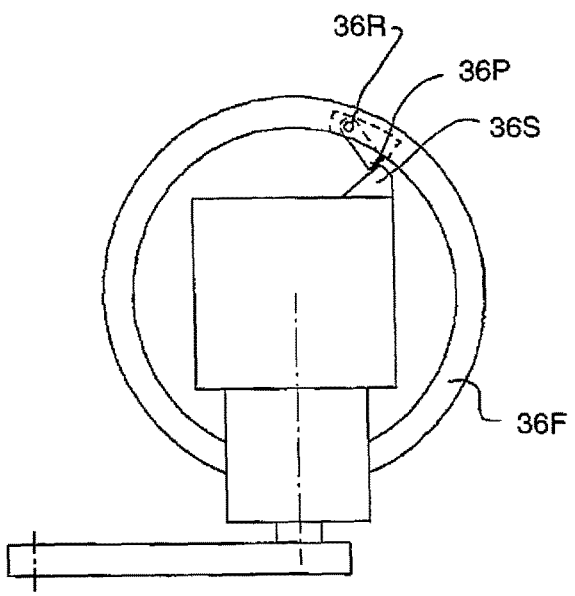
FIG. 7 is a similar view to that of FIG. 6 showing the device in the set predetermined position.

Turning now to FIGS. 3, 6 and 7 there is shown an arrangement for halting the sickle bars 24A and 24B at the predetermined location shown where the cutting blades 23 are located intermediate the guards 14. However other locations may be selected for the shutdown position if required. In the embodiment shown a center line 23C of the cutting blade is located midway between center lines 14C of the guards 14.

This position is obtained by providing a pawl 36P which cooperates with a stop member 36S. The pawl 36P is carried on the flywheel 36F and a suitable position so that it can cooperate with the stop member 36S at a required time during shutdown. The pawl 36P is pivotal on a pivot mounting 36R and carried so that it is normally detracted during the rotation of the flywheel 36F so that it does not interfere with the normal driving action during operation. However during a shutdown process, the pawl 36P moves from the retracted position into an engagement position where it engages the stop member 36S to stop rotation of the flywheel at the predetermined angular position defined by the stop member 36S. This position is arranged so that it coincides with the above defined position required for the blades 23 relative to the guards 14.

In the stopping procedure, the flywheel is brought to a halt or to a slowed operation allowing the pawl to deploy. The flywheel is then driven slowly from whatever position it obtains during the shutdown procedure to bring the pawl up to engagement with the stop member. On reaching the stop member the movement of the flywheel is halted. These operations are controlled by the control unit 60 which includes a control line operating the pump 40. It will be appreciated that the pawl and the stop member can be located at any suitable position within the drive system. It will be appreciated that the slow movement of the flywheel from its initial halted position up to the stop member can be carried out in a forward direction or in a reversed direction as required, as controlled by the control unit 60 operating on the pump 40.

This arrangement provides the ability to have the sickle section centered between guard points when the knife stops. This positioning is required in order to remove and replace a sickle section. Traditionally, the operator must manually move the knife to this position by somehow turning the knife drive. This typically requires opening the end panel of the header and turning the drive by hand. The present arrangement can be used on the double sickle headers as described above or can be used in relation to a single sickle bar system where only a single drive system is provided. In an arrangement where there is only a single sickle bar, the counting arrangement described above can be used to detect the position of the single sickle bar, using an input of an initial position which can be provided by any of the arrangements described herein. The arrangement described herein can be used on any sickle knife cutting system for example on combines or windrowers.

In this arrangement a pawl is added to a rotating member of the knife drive. In normal forward operation, the pawl is forced away from the center of the drive due to the centrifugal action of the rotating drive. When the drive is shut off it is allowed to come to a stop. When the drive is then reversed slowly, the pawl falls towards the center of the drive and engages on the stop at the precise location where the section is centered between the guard points. This stop location is known to be the center of the knife stroke.

On a double sickle header, there would be a pawl on each drive and each one would engage a separate stop to stop the respective knife at the correct location.

In an alternative arrangement without using the mechanical stop system of the pawl, the arrangement can use the location and counting system described above. Thus in the arrangement as shown in FIG. 2, the system essentially knows the position of the knife at any time during operation and hence has information in the control 60 as to when the sickle section is centered between the guard points, that is the center of the knife stroke. Using this information, in a first mode of operation, when the knife is shut off, it is allowed to come to a stop at any position. However it is not mandatory for it to completely stop and the arrangement could use this method before knife is completely stopped. Then, the controller 60 commands the knife flow control valve 65, that is the main valve that controls the knife on/off and sets the knife speed to allow a small amount of fluid to the knife drives 36, 37 to turn the drive slowly. Once the sickle section is known by counting the pulses to be centered between the guard points, the valve closes and the knife stops.

In a potential variation of the above method for a double sickle drive, the knife flow control valve 65 is commanded to provide fluid to the drive to turn the drive slowly. Once the slave knife is at the center of the stroke, the system fully opens the slave motor flow control valve 42 (FIG. 4) and bypasses fluid around the slave motor directly to the reservoir, stopping the slave knife motor 39. Then, when the master knife is centered, the system operates the knife flow control valve 65 and stops the master drive.

With the single valve version of the knife timing system of FIG. 5, the master side is set to the center of the stroke and then the bypass valve 41 opens fully until the slave side motor 39 is centered and then the main knife flow control valve 65 closes.

In regard to combine harvester headers, the control of the header is operated from combine harvester so that the control 60 does not have full control of the knife drive flow going to the header pump 40. Thus the system operates to instruct the combine operator to select a 'Change Sickle Section' function acts to turn the knife slowly to center the section in the guard. In another option the system operates to instruct the operator to reverse the header slowly and then center the section at the end of the reverse procedure.

Figure 8:
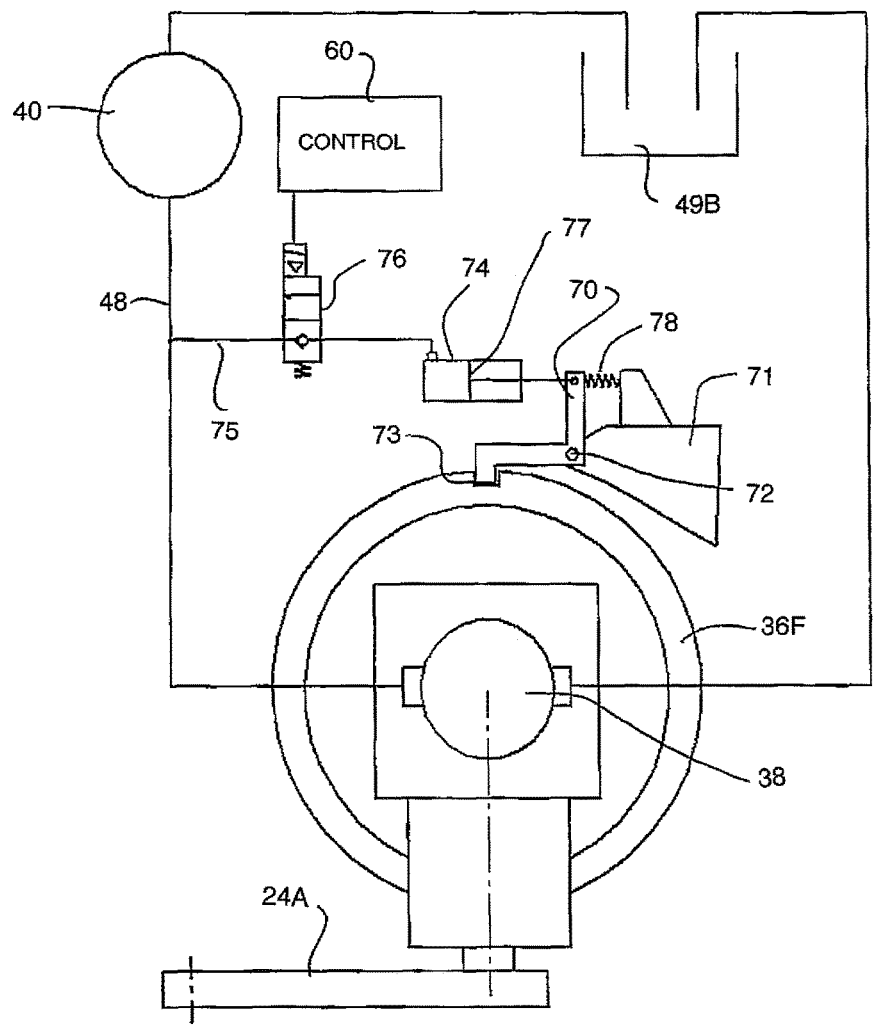
FIG. 8 is a schematic illustration of one of the drive arrangements showing a second pawl device mounted on the frame adjacent the rotary member for stopping the rotary member at the predetermined position.

An alternative arrangement is shown in FIG. 8 where the pawl system includes a pawl which is pivoted on the header frame, not the flywheel or gear wheel, and engages a fixed point on the flywheel. For example the pawl can fall into a notch or engage a protrusion on the flywheel when activated to stop the flywheel at the known position.

Thus as shown in FIG. 8, a pawl 70 is mounted on a bracket 71 carried on the frame at a location adjacent to the flywheel 36F. The pawl 70 is pivotal on a pin 72 and is movable into a notch 73 provided on the flywheel 36F. In normal operation, the pawl 70 is maintained out of engagement with the flywheel by pressure applied to a cylinder 74 by fluid in a line 75 from the pump 40. The pressurized fluid in the line 75 is supplied through a valve 76 operated by the control 60 so that when the valve 76 is open the pressure from the fluid biases the pawl 70 by a piston 77 into a retracted position of the pawl 70. At shut down of the system, the valve 76 is closed to release the fluid pressure so the spring 78 acts to bias the pawl 70 in to the engagement position shown where a portion is engaged into the notch 73 to stop the flywheel 36F at the specific location defined by the notch 73. Thus when the drive is started, the pressure to the motor acts to extend the cylinder 77 which disengages the pawl from the notch, and allows the flywheel to turn. The check ball in the valve keeps the cylinder extended even if the drive pressure drops to zero.

Upon shutdown, the control 60 monitors the speed of the flywheel and when it falls below a threshold value for example 100 RPM, then the control sends a signal to the valve 76 which then opens and allows the cylinder 74 to retract and causes the spring 78 to push the pawl into the notch in the flywheel the next time in comes around to the pawl. The reason the system waits until the flywheel has slowed is so that the flywheel has less energy and is easier to stop abruptly with the pawl 70.

When the drive is shut off, the pressure between the pump 40 and motor 38 becomes small enough that the compression spring 78 can overcome any force at the cylinder 74.

A second version (not shown) of this method can be used where the valve 76 is replaced by a solenoid trigger and latch mechanism. The pawl 70 is disengaged from the flywheel notch in a similar method to above using a cylinder 74 when the drive is started. The pawl 70 is held disengaged by a latch even if the drive pressure goes to zero. When the drive is shut off, the control 60 monitors the speed of the flywheel and when it is slow enough, the solenoid is commanded to release the latch which allows the pawl to fall into the notch on the flywheel.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop cutting apparatus comprising:
  a frame structure arranged for forward travel over ground having a standing crop thereon;
  a cutter bar secured to the frame structure and extending transversely across a front end of said frame structure;
  a plurality of knife guards mounted in spaced relation along said cutter bar and projecting forwardly therefrom;
  each of said guards having a ledger surface with opposed side edges thereof arranged to provide first and second shearing edges;
  at least one sickle bar mounted in transversely extending position driven for reciprocating movement relative to said knife guards and having a plurality of sickle knife blades mounted thereon for movement therewith with each of the sickle knife blades having two side cutting edges which cooperate with said shearing edges of said knife guards;
  a drive system for driving said at least one sickle bar through repeated cycles of reciprocating movement from start-up through to a shut-down;

the drive system being arranged to halt said at least one sickle bar at said shut-down at a predetermined position of the sickle knife blades relative to the knife guards in which each of the sickle knife blades is located between two adjacent knife guards allowing removal and replacement of at least one of the sickle knife blades from said adjacent knife guards at said predetermined position.

2. The crop cutting apparatus according to claim 1 wherein said at least one sickle bar is halted at said shut-down at said predetermined position in which a center line of each of the knife blades is located midway between center lines of each of said two adjacent knife guards.

3. The crop cutting apparatus according to claim 1 wherein the drive system includes a shut-down procedure by which said at least one sickle bar is driven at a speed slower than a cutting speed to move to said predetermined position.

4. The crop cutting apparatus according to claim 1 wherein the drive system includes a shut-down procedure by which said at least one sickle bar is driven in a reverse direction to move to said predetermined position.

5. The crop cutting apparatus according to claim 3 wherein the drive system comprises a rotary member and a pawl movable to an engagement position with respect to the rotary member to locate said at least one sickle bar at said predetermined position.

6. The crop cutting apparatus according to claim 4 wherein the drive system comprises a rotary member and a pawl movable to an engagement position with respect to the rotary member to locate said at least one sickle bar at said predetermined position.

7. The crop cutting apparatus according to claim 1 wherein said at least one sickle bar comprises a first and a second sickle bar mounted in transversely extending position and driven for reciprocating movement relative to said knife guards such that the first and second sickle bars reciprocate at the same frequency but out of phase to reduce vibration.

8. A crop cutting apparatus comprising:
a frame structure arranged for forward travel over around having a standing crop thereon;
a cutter bar secured to the frame structure and extending transversely across a front end of said frame structure;
a plurality of knife guards mounted in spaced relation along said cutter bar and projecting forwardly therefrom;
each of said guards having a ledger surface with opposed side edges thereof arranged to provide first and second shearing edges;
at least one sickle bar mounted in transversely extending position driven for reciprocating movement relative to said knife guards and having a plurality of knife blades mounted thereon for movement therewith with each of the knife blades having two side cutting edges which cooperate with said shearing edges of said knife guards;
a drive system for driving said at least one sickle bar through repeated cycles of reciprocating movement from start-up through to a shut-down;
the drive system being arranged to halt said at least one sickle bar at said shut-down at a predetermined position of the knife blades relative to the knife guards;
wherein the drive system includes a sensing system which generates a plurality of sensor signals for each cycle of reciprocating movement of said at least one sickle bar;
and wherein the drive system comprises a control device responsive to the sensor signals arranged to determine, at said shut down, when said knife blades are in said predetermined position of the knife blades to halt said at least one sickle bar at said predetermined position.

9. The crop cutting apparatus according to claim 8 wherein said drive system includes a rotary member and wherein the sensing system is arranged to generate the sensor signals at spaced positions around the rotary member.

10. The crop cutting apparatus according to claim 8 wherein the sensing system comprises a plurality of markers which are arranged to pass a stationary sensor so as to generate a sensing signal for each passing marker.

11. The crop cutting apparatus according to claim 8 wherein the control device includes an arrangement for inputting once, for use in a plurality of cycles, data indicating for said at least one sickle bar a specific angle of the cutter bar in the cycle relative to the markers associated with said at least one sickle bar.

12. The crop cutting apparatus according to claim 8 wherein the drive system is arranged to halt said at least one sickle bar at said shut-down at said predetermined position in which each of the sickle knife blades is located between two adjacent knife guards allowing removal and replacement of at least one of the sickle knife blades from said adjacent knife guards at said predetermined position.

13. The crop cutting apparatus according to claim 8 wherein the drive system includes a shut-down procedure by which said at least one sickle bar is driven at a speed slower than a cutting speed to move to said predetermined position.

14. The crop cutting apparatus according to claim 8 wherein the drive system includes a shut-down procedure by which said at least one sickle bar is driven in a reverse direction to move to said predetermined position.

15. A crop cutting apparatus comprising:
a frame structure arranged for forward travel over ground having a standing crop thereon;
a cutter bar secured to the frame structure and extending transversely across a front end of said frame structure;
a plurality of knife guards mounted in spaced relation along said cutter bar and projecting forwardly therefrom;
each of said guards having a ledger surface with opposed side edges thereof arranged to provide first and second shearing edges;
at least one sickle bar mounted in transversely extending position driven for reciprocating movement relative to said knife guards and having a plurality of knife blades mounted thereon for movement therewith with each of the knife blades having two side cutting edges which cooperate with said shearing edges of said knife guards;
a drive system for driving said at least one sickle bar through repeated cycles of reciprocating movement from start-up through to a shut-down;
the drive system being arranged to halt said at least one sickle bar at said shut-down at a predetermined position of the knife blades relative to the knife guards;
wherein the drive system includes a shut-down procedure by which said at least one sickle bar is driven at a speed slower than a cutting speed to move to said predetermined position.

16. The crop cutting apparatus according to claim 15 wherein the drive system comprises a rotary member and a pawl movable to an engagement position with respect to the rotary member to locate said at least one sickle bar at said predetermined position.

17. A crop cutting apparatus comprising:
a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom;

each of said guards having a ledger surface with opposed side edges thereof arranged to provide first and second shearing edges;

at least one sickle bar mounted in transversely extending position driven for reciprocating movement relative to said knife guards and having a plurality of knife blades mounted thereon for movement therewith with each of the knife blades having two side cutting edges which cooperate with said shearing edges of said knife guards;

a drive system for driving said at least one sickle bar through repeated cycles of reciprocating movement from start-up through to a shut-down;

the drive system being arranged to halt said at least one sickle bar at said shut-down at a predetermined position of the knife blades relative to the knife guards;

wherein the drive system includes a shut-down procedure by which said at least one sickle bar is driven in a reverse direction to move to said predetermined position.

18. The crop cutting apparatus according to claim 17 wherein the drive system comprises a rotary member and a pawl movable to an engagement position with respect to the rotary member to locate said at least one sickle bar at said predetermined position.

\* \* \* \* \*